(12) United States Patent
Durai et al.

(10) Patent No.: US 10,319,220 B2
(45) Date of Patent: Jun. 11, 2019

(54) CONTROL ARRANGEMENT AND CONTROL METHOD

(71) Applicant: Rohde & Schwarz GmbH & Co. KG, München (DE)

(72) Inventors: Rajashekar Durai, Singapore (SG); KokMeng Wong, Singapore (SG); Henry Foo, Singapore (SG)

(73) Assignee: ROHDE & SCHWARZ GMBH & CO. KG, Munich (DE)

( * ) Notice: Subject to any disclaimer, the term of this patent is extended or adjusted under 35 U.S.C. 154(b) by 0 days.

(21) Appl. No.: 15/499,836

(22) Filed: Apr. 27, 2017

(65) Prior Publication Data

US 2018/0315303 A1 Nov. 1, 2018

(51) Int. Cl.
| | | |
|---|---|---|
| *G08C 23/04* | (2006.01) | |
| *G10L 15/22* | (2006.01) | |
| *G10L 19/00* | (2013.01) | |
| *G06F 3/16* | (2006.01) | |

(52) U.S. Cl.
CPC ............ *G08C 23/04* (2013.01); *G06F 3/167* (2013.01); *G10L 15/22* (2013.01); *G10L 19/0019* (2013.01); *G08C 2201/40* (2013.01); *G10L 2015/223* (2013.01); *G10L 2015/225* (2013.01)

(58) Field of Classification Search
CPC ............ G08C 23/04; H04W 72/0446; H04W 72/082; H04W 72/085; H04W 24/10; H04L 5/0073; G10L 15/22; G10L 19/0019
See application file for complete search history.

(56) References Cited

U.S. PATENT DOCUMENTS

| | | | | |
|---|---|---|---|---|
| 5,769,032 A | * | 6/1998 | Yarnall, Sr. .......... | A01K 15/023 119/721 |
| 8,254,481 B1 | * | 8/2012 | McCloskey .............. | H04K 1/10 375/130 |
| 8,259,830 B1 | * | 9/2012 | McCloskey .............. | H04K 1/10 375/130 |
| 8,553,791 B1 | * | 10/2013 | McCloskey .............. | H04K 1/10 375/130 |
| 9,246,542 B1 | * | 1/2016 | McCloskey .............. | H04K 1/10 |
| 9,722,660 B1 | * | 8/2017 | McCloskey ............ | H04B 1/707 |
| 2002/0061024 A1 | * | 5/2002 | Malkemes ........... | H04B 7/0845 370/401 |
| 2003/0061033 A1 | * | 3/2003 | Dishert .................. | G08C 19/28 704/201 |

(Continued)

OTHER PUBLICATIONS

Huhle et al., "Camera-based three-dimensional real-time particle tracking at kHz rates and Ångström accuracy," Nature Communications 6, Article No. 5885, pp. 1-8 (Jan. 7, 2015).

(Continued)

*Primary Examiner* — Orlando Bousono
(74) *Attorney, Agent, or Firm* — Shumaker & Sieffert, P.A.

(57) ABSTRACT

A control arrangement for communicating remotely with an electronic device comprises a local control unit associated with the electronic device, the local control unit comprising a first non-RF spectrum receiver for non-RF spectrum uplink communication signals and a controller coupled to the first receiver for controlling the electronic device based on the received non-RF spectrum uplink communication signals, and a remote control unit with a first non-RF spectrum transmitter for transmitting the non-RF spectrum uplink communication signals to the local control unit.

19 Claims, 5 Drawing Sheets

(56) References Cited

U.S. PATENT DOCUMENTS

| | | | |
|---|---|---|---|
| 2003/0125007 A1* | 7/2003 | Whikehart | H04B 1/406 455/343.1 |
| 2004/0092233 A1* | 5/2004 | Rudrapatna | H04W 52/60 455/69 |
| 2006/0003704 A1* | 1/2006 | Jin | H04B 17/336 455/70 |
| 2006/0193270 A1* | 8/2006 | Gehasie | H04B 11/00 370/282 |
| 2007/0245393 A1* | 10/2007 | Fernandez | H04L 5/0044 725/118 |
| 2008/0009254 A1* | 1/2008 | Jin | H04B 17/336 455/226.3 |
| 2009/0213974 A1* | 8/2009 | Haralabidis | H04B 15/04 375/376 |
| 2010/0095330 A1* | 4/2010 | Pal | H01M 10/465 725/68 |
| 2010/0203854 A1* | 8/2010 | Yu | H04L 25/03834 455/127.1 |
| 2011/0051679 A1* | 3/2011 | Fernandez | H04L 5/0044 370/329 |
| 2011/0077017 A1* | 3/2011 | Yu | H04L 5/0007 455/452.1 |
| 2011/0134809 A1* | 6/2011 | Yu | H04L 5/0048 370/277 |
| 2012/0236913 A1* | 9/2012 | Fernandez | H04L 5/0044 375/222 |
| 2013/0201860 A1* | 8/2013 | Yu | H04L 5/0048 370/252 |
| 2013/0201898 A1* | 8/2013 | Yu | H04L 5/0048 370/312 |
| 2013/0265995 A1* | 10/2013 | Dhanda | H04L 5/0048 370/337 |
| 2013/0265996 A1* | 10/2013 | Dhanda | H04L 5/0048 370/337 |
| 2014/0010208 A1* | 1/2014 | Yu | H04L 5/0007 370/336 |
| 2014/0056274 A1* | 2/2014 | Yu | H04L 5/0007 370/330 |
| 2014/0267934 A1* | 9/2014 | Hardin | H04N 21/654 348/734 |
| 2014/0269374 A1* | 9/2014 | Abdelmonem | H04L 5/0026 370/252 |
| 2014/0269545 A1* | 9/2014 | Galeev | H04L 5/0026 370/329 |
| 2014/0269606 A1* | 9/2014 | Abdelmonem | H04L 5/0026 370/330 |
| 2014/0269849 A1* | 9/2014 | Abdelmonem | H04L 5/0026 375/148 |
| 2014/0269850 A1* | 9/2014 | Abdelmonem | H04L 5/0026 375/148 |
| 2014/0273861 A1* | 9/2014 | Abdelmonem | H04L 5/0026 455/63.1 |
| 2014/0274093 A1* | 9/2014 | Abdelmonem | H04L 5/0026 455/452.1 |
| 2014/0274094 A1* | 9/2014 | Abdelmonem | H04L 5/0026 455/452.1 |
| 2014/0274099 A1* | 9/2014 | Abdelmonem | H04L 5/0026 455/452.2 |
| 2014/0274100 A1* | 9/2014 | Galeev | H04L 5/0026 455/452.2 |
| 2014/0274132 A1* | 9/2014 | Abdelmonem | H04L 5/0026 455/456.2 |
| 2015/0163818 A1* | 6/2015 | Abdelmonem | H04L 5/0026 455/452.1 |
| 2015/0189668 A1* | 7/2015 | Abdelmonem | H04L 5/0026 370/252 |
| 2015/0229352 A1* | 8/2015 | Abdelmonem | H04L 5/0026 375/148 |
| 2015/0257036 A1* | 9/2015 | Abdelmonem | H04L 5/0026 455/423 |
| 2015/0304876 A1* | 10/2015 | Abdelmonem | H04L 5/0026 370/252 |
| 2015/0318945 A1* | 11/2015 | Abdelmonem | H04L 5/006 370/329 |
| 2015/0318964 A1* | 11/2015 | Abdelmonem | H04L 5/006 370/329 |
| 2015/0319625 A1* | 11/2015 | Abdelmonem | H04L 5/006 455/418 |
| 2015/0319763 A1* | 11/2015 | Abdelmonem | H04L 5/0026 370/230 |
| 2015/0319768 A1* | 11/2015 | Abdelmonem | H04L 5/006 455/452.1 |
| 2015/0326463 A1* | 11/2015 | Solondz | H04L 43/0829 370/252 |
| 2016/0050579 A1* | 2/2016 | Galeev | H04L 5/0026 370/252 |
| 2016/0050581 A1* | 2/2016 | Abdelmonem | H04L 5/0026 370/252 |
| 2016/0095014 A9* | 3/2016 | Yu | H04L 5/0007 370/330 |
| 2016/0135061 A1* | 5/2016 | Abdelmonem | H04L 5/0026 455/422.1 |
| 2016/0192362 A1* | 6/2016 | Galeev | H04L 5/0026 370/335 |
| 2016/0198211 A1* | 7/2016 | Hardin | H04N 21/654 348/734 |
| 2016/0198353 A1* | 7/2016 | Abdelmonem | H04L 5/0026 370/252 |
| 2016/0249367 A1* | 8/2016 | Abdelmonem | H04L 5/0026 |
| 2016/0254840 A1* | 9/2016 | Abdelmonem | H04L 5/0026 375/148 |
| 2016/0323086 A1* | 11/2016 | Abdelmonem | H04L 5/0026 |
| 2017/0103647 A1* | 4/2017 | Davis | G06F 1/3287 |
| 2017/0142249 A1* | 5/2017 | Shinar | H04M 1/72533 |
| 2017/0188374 A1* | 6/2017 | Galeev | H04W 72/082 |
| 2017/0230128 A1* | 8/2017 | Abdelmonem | H04J 11/005 |

OTHER PUBLICATIONS

"IEEE Standard for Local and Metropolitan Area Networks—Part 15.7: Short-Range Wireless Optical Communication Using Visible Light," IEEE Std 802.15.7™-2011, pp. 1-286 (Sep. 6, 2011).

Dios et al., "Localization and Tracking Using Camera-Based Wireless Sensor Networks," Sensor Networks, In Sensor Fusion—Foundation and Applications; InTech: Rijeka, Croatia, Chapter 3, pp. 41-60 (2011).

Hartmann et al., "Camera-Based System for Tracking and Position Estimation of Humans," Conference on Design and Architectures for Signal and Image Processing (DASIP), pp. 62-67 (2010).

Mir-Nasiri, "Camera-based 3D Object Tracking and Following Mobile Robot," Robotics, Automation and Mechatronics, IEEE Conference, pp. 1-7 (Jul. 2006).

* cited by examiner

CONTROL ARRANGEMENT AND CONTROL METHOD

TECHNICAL FIELD

The present invention relates to a control arrangement for communicating remotely with an electronic device. The present invention further relates to a respective control method.

BACKGROUND

Although applicable in principle to any system that may be controlled by an operator, the present invention and its underlying problem will be hereinafter described in combination with test devices.

Test devices and laboratory equipment, like e.g. signal generators, spectrum analyzers, oscilloscopes, network analyzers, ranging devices, medical devices or the like, provide a plurality of possible user interactions and configuration options.

Traditionally the user interface is provided integrally with the respective device or equipment. However, controlling the respective device is therefore inflexible.

Against this background, the problem addressed by the present invention is providing improved control of electronic devices.

SUMMARY

The present invention solves this object by a control arrangement with the features of claim 1 and a control method with the features of claim 17.

Accordingly it is provided:

A control arrangement for communicating remotely with an electronic device, which may e.g. be sensitive to radio interference, the control arrangement comprising a local control unit associated with the electronic device, the local control unit comprising a first non-RF spectrum receiver for non-RF spectrum uplink communication signals and a controller coupled to the first receiver for controlling the electronic device based on the received non-RF spectrum uplink communication signals, and a remote control unit, which may be located remotely from the electronic device and therefore the local control unit, with a first non-RF spectrum transmitter for transmitting the non-RF spectrum uplink communication signals to the local control unit.

A control method for remotely controlling an electronic device comprises transmitting non-RF spectrum uplink communication signals to a local control unit at the electronic device from a remote control unit, receiving the non-RF spectrum uplink communication signals at the local control unit, and controlling the electronic device based on the received non-RF spectrum uplink communication signals.

The control arrangement of the present invention provides two separate units. The first unit, the local control unit, is provided at the electronic device and may control the electronic device based on the non-RF spectrum uplink communication signals. The second unit, the remote control unit, may e.g. be provided to the user of the electronic device for issuing control commands to the electronic device.

It is understood that the non-RF spectrum uplink communication signals refer to wireless signals and that the uplink in this regard refers to the communication from the remote control unit to the local control unit.

With the presented arrangement it is possible for a user to control the electronic device remotely, i.e. without physically interacting with the electronic device. This on the one hand allows the user to perform other tasks at the same time as controlling the electronic device and further to be spaced apart at a distance from the electronic device that would not allow the user to physically control the electronic device.

The present invention at the same time performs the communication, e.g. the remote control, via signals in the non-RF wireless spectrum, such a spectrum may e.g. be the visible light spectrum or the invisible light spectrum, like e.g. the infrared spectrum. The local control unit and the remote control unit may therefore e.g. communicate via visible light communication or infrared communication. Visible light communication may refer to a communication performed according to the IEEE 802.15.7 standard, which is incorporated herein by reference. Further possible visible light communication standards, which are incorporated herein by reference may e.g. comprise Axrtek MOMO, the Visible Light Communication Consortium (VLCC) Specification Standard.

With this wireless non-RF communication the control arrangement is especially suitable for control of electronic devices in RF sensitive areas or for control of RF sensitive electronic devices. If for example a RF wireless control would be used in a test environment for RF devices, like e.g. cell phones or the like, the communication signals of the test arrangement could influence the measurements. The same applies e.g. to medical equipment, like e.g. CT or MRI imaging devices. With the control arrangement of the present invention such negative influences are avoided while providing full control over the electronic device.

Further, the present invention e.g. allows controlling electronic devices that are arranged behind a shielding, like e.g. electronic devices provided inside of a test chamber with devices under test. The test chamber may e.g. comprise a window that may pass through the non-RF spectrum communication signals from the remote control unit to the local control unit.

Further embodiments of the present invention are subject of the further subclaims and of the following description, referring to the drawings.

In a possible embodiment, the remote control unit may comprise a user input device for receiving user input, wherein the first non-RF spectrum transmitter may transmit the non-RF spectrum uplink communication signals based on the received user input.

The user input device may be any type of user input that allows the user to interact remotely with the electronic device. Such a user input device may e.g. comprise knobs, switches, buttons or the like. Respective user inputs may then be transmitted to the local control unit and be translated by the controller into respective control signals.

In a possible embodiment, the user input device may comprise a microphone for receiving audio user input, and the first non-RF spectrum transmitter may comprise a modulator that modulates non-RF spectrum uplink communication signals based on the received audio user input.

The user input device may e.g. be any kind of microphone. The audio user input may especially comprise spoken words. However, in one embodiment the user may wear the microphone like a headset or somehow attached to his clothes, e.g. via clips. Not having to hold the microphone while remotely controlling the electronic device will allow the user to perform further tasks with his hands at the same time, e.g. on a DUT or the like.

The modulator may e.g. be an analogue modulator that modulates the received audio user input into the non-RF uplink signals, e.g. with an AM or FM modulation scheme. However, the modulator may also comprise A/D converters and encode the received audio user input into a digital data stream that e.g. conforms to a visible light based communication standard.

The user may e.g. receive visual feedback from the electronic device if the electronic device is in view of the user. The user will e.g. see changes on a display of the electronic device or status indicators, like e.g. LEDs, of the electronic device.

In a possible embodiment, the controller of the local control unit may comprise a voice decoder for decoding the audio user input and providing respective control signals.

The voice decoder may be coupled to the first non-RF spectrum receiver and receive the audio user input. The voice decoder may e.g. comprise a voice recognition device. The voice recognition device may either be a hardware device, like e.g. an ASIC or FPGA or the like that comprises the respective voice analysis functions. Alternatively, the voice recognition device may be a computer program product that may e.g. be executed by the controller. Such a hardware device or computer program product may comprise a database of audio commands and may comprise a comparator that compares the received audio user input with the audio commands in the database. Further a mapping table or mapping database may be provided that maps the identified audio command to respective control signals for controlling the electronic device.

The voice decoder may also comprise a training function that trains the voice decoder according to the voice of a specific user. Voice data may be stored for a plurality of different users.

In a possible embodiment, the voice decoder may comprise a command converter for converting the decoded audio user input into "Standard Commands for Programmable Instruments", SCPI, based control signals.

SCPI is a standard for syntax and commands to use in controlling programmable test and measurement devices.

The command converter may e.g. comprise a mapping from audio commands that may be provided by a user to the respective SCPI commands. The command converter may e.g. comprise a respective look-up-table that provides the mapping.

It is understood that user provided audio user input may also comprise parameters, like e.g. ranges for signals or for setting output parameters. Therefore, the voice decoder and/or the command converter may comprise a segmenting unit that segments the received audio user inputs or user commands into the command and the parameter section. The parameters may be converted by the voice decoder and/or the command converter into respective numbers.

The segmentation may e.g. be performed based on keywords. Commands may e.g. have the structure "set XX to YY", wherein XX refers to a parameter and YY to the respective value. The voice decoder may segment such a command based on the keywords "set" and "to". It is understood, that this command structure is just exemplarily presented and that any other structure is also possible.

In a possible embodiment, the remote control unit may comprise a second non-RF spectrum receiver for receiving non-RF spectrum downlink communication signals, and the controller of the local control unit may generate non-RF spectrum downlink communication signals, e.g. in response to received non-RF spectrum uplink communication signals or respective feedback signals. In addition, the local control unit may comprise a second non-RF spectrum transmitter for transmitting the non-RF spectrum downlink communication signals to the remote control unit.

The non-RF spectrum downlink communication signals serve to provide e.g. direct feedback to the remote control unit, and therefore to the user.

The first non-RF spectrum transmitter and the second non-RF spectrum transmitter may both communicate via the same type of non-RF spectrum signals, like e.g. visible light. It is understood, that the first non-RF spectrum transmitter and the second non-RF spectrum transmitter may therefore comprise some kind of arbitration unit that performs signal arbitration for the two transmitters. As an alternative, the first non-RF spectrum transmitter and the second non-RF spectrum transmitter may use different types of non-RF spectrum signals or the same types of non-RF spectrum signals with different wavelengths.

In a possible embodiment, the remote control unit may comprise an output device that provides the feedback signals to a user.

The user of the remote control unit may be informed of the outcome of the commands he provided to the electronic device via the user input. This is especially useful if the user can't see the electronic device.

In a possible embodiment, the controller of the local control unit may generate the feedback signals as audio feedback signals, and the output device may comprise a speaker device.

If the output device is a speaker the feedback signal may be provided as audio feedback signal that the user may hear via the speaker. The audio feedback signal may e.g. comprise beeps or sequences of beeps or different kinds of sounds that may e.g. represent an "OK" or "Error" signal.

The speaker can e.g. be integrated into headphones. In one embodiment, the headphones may be integrally formed with the microphone, e.g. in a headset. This allows the user to communicate with the electronic device in a bidirectional fashion without the need to use his hands to control the electronic device.

In a possible embodiment, the controller of the local control unit may comprise a voice encoder for encoding the feedback signals as voice feedback signals. Optionally, the voice encoder may be configured to encode SCPI based result signals into voice feedback signals.

The electronic device or the controller may generate or provide feedback signals for the user in reaction to received user inputs. The feedback signals may be provided as voice feedback, i.e. as spoken words.

It is understood, that the voice decoder and the voice encoder may both be adapted to handle one or more languages and that new languages may e.g. be provided via firmware or software updates.

In a possible embodiment, the controller of the local control unit may comprise a dialogue engine coupled to the voice decoder and the voice encoder for performing a natural speech dialogue with a user.

The dialogue engine may e.g. comprise a scripting engine or e.g. an artificial intelligence based engine that may handle user inputs and provide respective feedback signals. The user may therefore interact with the electronic device naturally and does not have to learn any specific behavior to control the electronic device.

In a possible embodiment, the local control unit may be integrated into the electronic device or the local control unit may be connectable to an interface of the electronic device.

The local control unit may be integrally formed as a part of the electronic device. The local control unit may e.g. be integrated into the main processor of the electronic device.

As an alternative the local control unit may be attachable to the electronic device. Such a local control unit may e.g. be a USB token or the like.

If the local control unit is attached to the electronic device via an interface, the local control unit may provide the control signals according to that interface.

For example a USB token may identify itself as serial port and provide the control signals as serial data to the electronic device.

In a possible embodiment, the first non-RF spectrum transmitter may comprise at least one optical emitter for emitting the non-RF spectrum uplink communication signals, and the first non-RF spectrum receiver may comprise respective optical receivers.

In a possible embodiment, the second non-RF spectrum transmitter may comprise at least one optical emitter for emitting the non-RF spectrum uplink communication signals, and the second non-RF spectrum receiver may comprise respective optical receivers.

It is understood, that optical transmitters may e.g. comprise LEDs or infrared diodes and that the optical receivers may e.g. comprise photo transistors or photo diodes.

If the first non-RF spectrum transmitter comprises one optical emitter, like a LED, a user may direct the emitter to the first non-RF spectrum receiver manually or e.g. by moving his head with the mounted head-set.

The first non-RF spectrum transmitter may also comprise a plurality of optical emitters and therefore emit the non-RF spectrum uplink communication signals in a plurality of directions. Aiming by the user will therefore not be necessary.

In a possible embodiment, the local control unit may comprise a tracking mechanism for tracking the remote control unit and the controller may aim the first non-RF spectrum receiver at the tracked remote control unit.

The tracking mechanism may e.g. comprise a camera based tracking with a camera that records an image of a scene in front of the camera and with an image recognition process that identifies the remote control unit in the image. A mechanical moving structure may then point the first non-RF spectrum receiver at the detected remote control unit.

The tracking may e.g. work as described in "Camera-based 3D Object Tracking and Following Mobile Robot" by Nazim Mir-Nasiriin, which is included herein by reference. Further tracking methods that are included herein by reference may include "Localization and Tracking Using Camera-Based Wireless Sensor Networks" by J. R. Martinezde Dios et al., "Camera-based three-dimensional realtime particle tracking at kHz rates and Angstrom accuracy", by Alexander Huhle et al., "Camera-based system for tracking and position estimation of humans" by Robert Hartmann et al.

The identification may e.g. be performed based on image recognition algorithms that detect the shape of the remote control unit. As an alternative dedicated identification marks, like e.g. barcodes, QR-codes or the like, may be provided on the remote control unit and be detected by the image recognition algorithms.

In a possible embodiment, the first non-RF spectrum receiver may comprise a solar panel.

The solar panel may substitute a single photo diode or photo transistor and provide a large area receiver. Aiming or directing the receiver will therefore not be crucial.

In a possible embodiment, the local control unit may at least in part be powered by the solar panel.

The solar panel may not only serve as a receiver for the non-RF spectrum communication signals. Instead the solar panel may also power the local control unit. It is understood, that in addition to the solar panel further energy supplies, like e.g. batteries or power connectors may be present.

BRIEF DESCRIPTION OF THE DRAWINGS

For a more complete understanding of the present invention and advantages thereof, reference is now made to the following description taken in conjunction with the accompanying drawings. The invention is explained in more detail below using exemplary embodiments which are specified in the schematic figures of the drawings, in which.

The appended drawings are intended to provide further under-standing of the embodiments of the invention. They illustrate embodiments and, in conjunction with the description, help to explain principles and concepts of the invention. Other embodiments and many of the advantages mentioned become apparent in view of the drawings. The elements in the drawings are not necessarily shown to scale.

In the drawings, like, functionally equivalent and identically operating elements, features and components are provided with like reference signs in each case, unless stated other-wise.

DETAILED DESCRIPTION OF THE DRAWINGS

Figure 1:
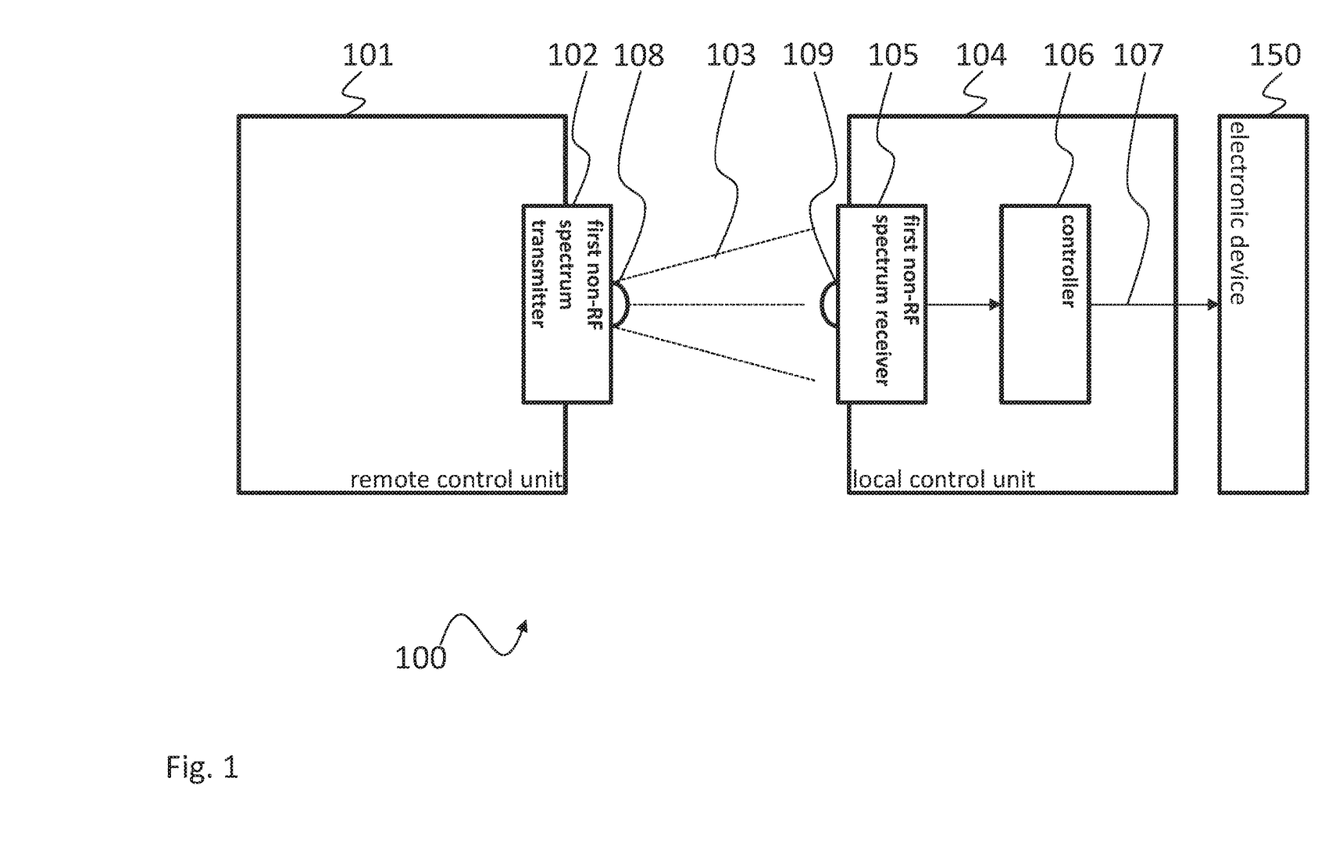
FIG. 1 shows a block diagram of an embodiment of a control arrangement according to the present invention.

FIG. 1 shows a block diagram of control arrangement 100.

The control arrangement 100 comprises a remote control unit 101 and a local control unit 104.

The remote control unit 101 comprises a first non-RF spectrum transmitter 102. In the control arrangement 100 the first non-RF spectrum transmitter 102 is just exemplarily shown as comprising a white LED 108 as optical emitter for emitting non-RF spectrum uplink communication signals 103.

The local control unit 104 comprises a first non-RF spectrum receiver 105. Just exemplarily the first non-RF spectrum receiver 105 comprises a photo diode 109 as optical receiver. The local control unit 104 further comprises a controller 106 that is coupled to the first non-RF spectrum receiver 105. The controller 106 is coupled to the electronic device 150 to provide control signals 107 to the electronic device 150.

Figure 3:
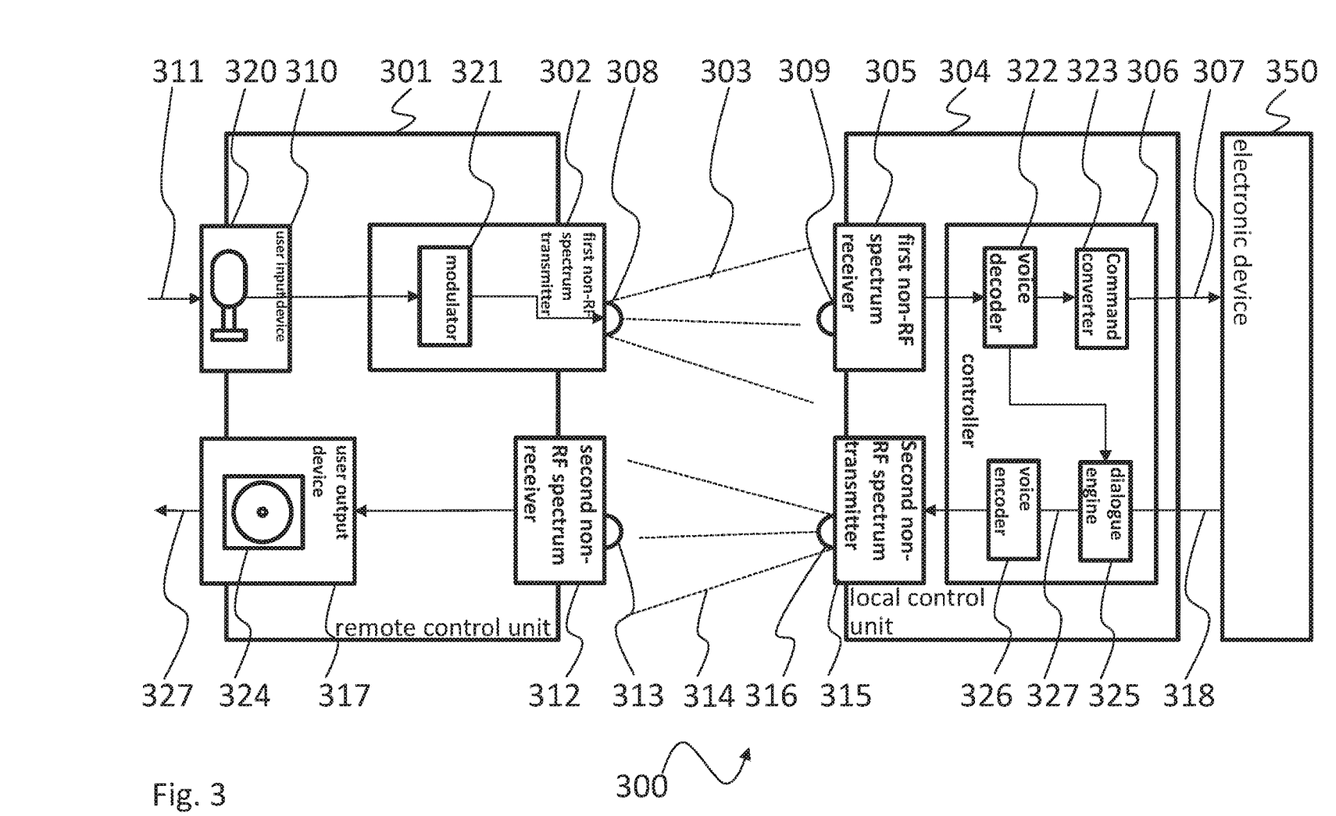
FIG. 3 shows a block diagram of another embodiment of a control arrangement according to the present invention.

In the control arrangement 100 the first non-RF spectrum transmitter 102 may e.g. transmit the non-RF spectrum uplink communication signals 103. User commands may e.g. server as a basis for the non-RF spectrum uplink communication signals 103. Although not shown such user commands may e.g. be provided via a keyboard with keys, knobs, sliders or the like. A further input arrangement is shown in FIG. 3.

The non-RF spectrum uplink communication signals 103 may comprise an encoding that allows the first non-RF spectrum receiver 105 and the controller 106 to extract the user commands. Such an encoding may e.g. comprise on/off keying, or amplitude modulation. The keying or modulation frequency may be high such that no visible change in the intensity of the light emitted by the white LED 108 is perceptible to the human eye.

The control arrangement 100 therefore provides an uplink data path from the remote control unit 101 to the local control unit 104 to control the electronic device 150.

With the arrangement of FIG. 1 it is possible to provide the user commands wirelessly to the electronic device 150 without causing any RF pollution in the vicinity of the electronic device 150. This is especially useful to control electronic devices 150, like e.g. test and measurement equipment or medical equipment that is RF sensitive or that is used in an RF sensitive surrounding.

Figure 2:
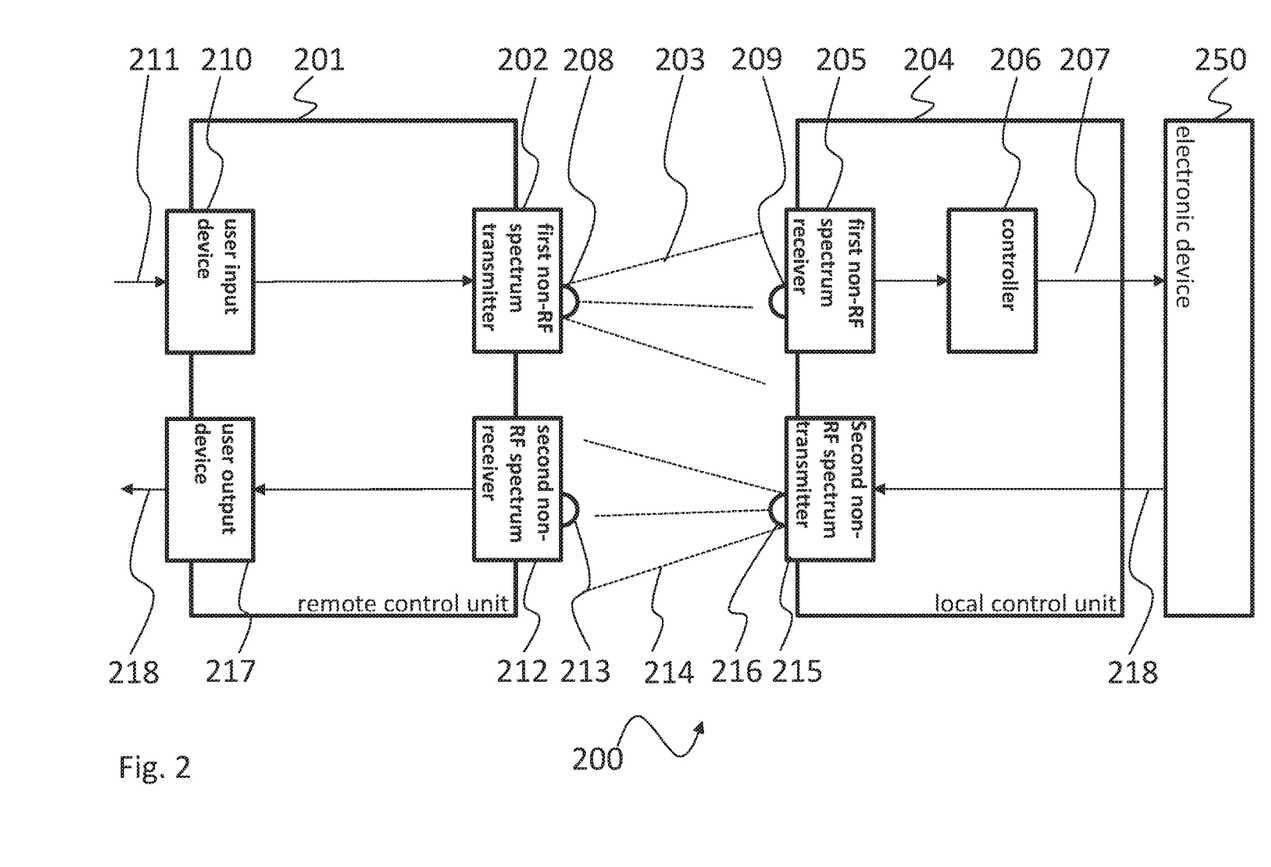
FIG. 2 shows a block diagram of another embodiment of a control arrangement according to the present invention.

FIG. 2 shows a block diagram of another control arrangement 200. The control arrangement 200 is based on the control arrangement 100 and therefore also comprises remote control unit 201 with the first non-RF spectrum transmitter 202 and with the white LED 208, as well as the local control unit 204 with the first non-RF spectrum receiver 205 and with the controller 206.

In addition, the remote control unit 201 comprises a user input device 210 for receiving user input 211. The first non-RF spectrum transmitter 202 then generates the non-RF spectrum uplink communication signals 203 based on the received user input 211.

In the control arrangement 200 the local control unit 204 further comprises a second non-RF spectrum transmitter 215 that has a white LED 216 as optical emitter. In addition the remote control unit 201 comprises a second non-RF spectrum receiver 212 with a photo diode 213 as optical receiver.

The electronic device 250 may provide feedback signals 218 in response to the command signals 207. This feedback signals 218 may e.g. indicate success or failure of the execution of respective command signals 207.

The second non-RF spectrum transmitter 215 generates non-RF spectrum downlink communication signals 214 based on the feedback signals 218. The second non-RF spectrum transmitter 215 may e.g. generate the non-RF spectrum downlink communication signals 214 based on the same modulation scheme as the first non-RF spectrum transmitter 202 generates the non-RF spectrum uplink communication signals 203.

The second non-RF spectrum receiver 212 receives the non-RF spectrum downlink communication signals 214 and demodulates the contents, i.e. the feedback signals 218, of the non-RF spectrum downlink communication signals 214 to output them via the output device 217 e.g. to a user.

The additional elements of the control arrangement 200 provide an additional downlink channel, i.e. a channel from the electronic device 250 to the remote control unit 201. Therefore, the control arrangement 200 allows providing feedback from the electronic device 250 to the user. This is especially useful if the user can't see the electronic device 250 while operating the electronic device 250.

FIG. 3 shows a block diagram of another control arrangement 300. The control arrangement 300 is based on the control arrangement 200. Therefore, the control arrangement 300 also comprises the remote control unit 301 with the user input device 310, the first non-RF spectrum transmitter 302, and the local control unit 304 with the first non-RF spectrum receiver 305 and the controller 306. Further, the local control unit 304 also comprises the second non-RF spectrum transmitter 315 and the remote control unit 301 also comprises the second non-RF spectrum receiver 312 and the output device 317.

In the remote control unit 301 the user input device 310 comprises a microphone 320 that records voice commands 311 from a user. The voice commands 311 are then modulated into the non-RF spectrum uplink communication signals 303 by modulator 321 that is provided in the first non-RF spectrum transmitter 302.

In the local control unit 304 the controller 306 comprises a voice decoder 322 and an optional command converter 323. The voice decoder 322 decodes the audio user input 311, i.e. it extracts the commands that the user spoke into the microphone 320, e.g. as text. The command converter 323 then uses the decoded audio user input 311 and maps the commands to specific SCPI commands 307 that are then transmitted to the electronic device 350. The command converter 323 is just exemplarily shown as SCPI converter. It is understood, that the command converter 323 may be omitted or provide any other type of output.

Further, in the controller 306 a dialogue engine 325 is provided. The dialogue engine 325 receives the extracted commands from the voice decoder 322 as well as the feedback signals 318 from the electronic device 350. Based on this information the dialogue engine 325 may provide audio feedback signals 327, which are then encoded into spoken voice signals by voice encoder 326. The voice encoder 326 provides this spoken voice signals to the second non-RF spectrum transmitter 315 that transmits a non-RF spectrum downlink communication signals 314 to the second non-RF spectrum receiver 312.

In the second non-RF spectrum receiver 312 although not shown a decoder or demodulator may decode or demodulate the non-RF spectrum downlink communication signals 314 and provide the respective audio signal to the output device 317. The output device 317 comprises a speaker 324 that will provide the audio feedback signals 327 to the user.

In FIG. 3 the microphone 320 and the speaker 324 are shown separated in the microphone 310 and the output device 317. It is understood that the microphone 320 and the speaker 324 may e.g. be provided together in a head-set or the like.

The control arrangement 300 shown in FIG. 3 allows a user to easily control the electronic device 350 performing a natural language spoken dialogue.

Figure 4:
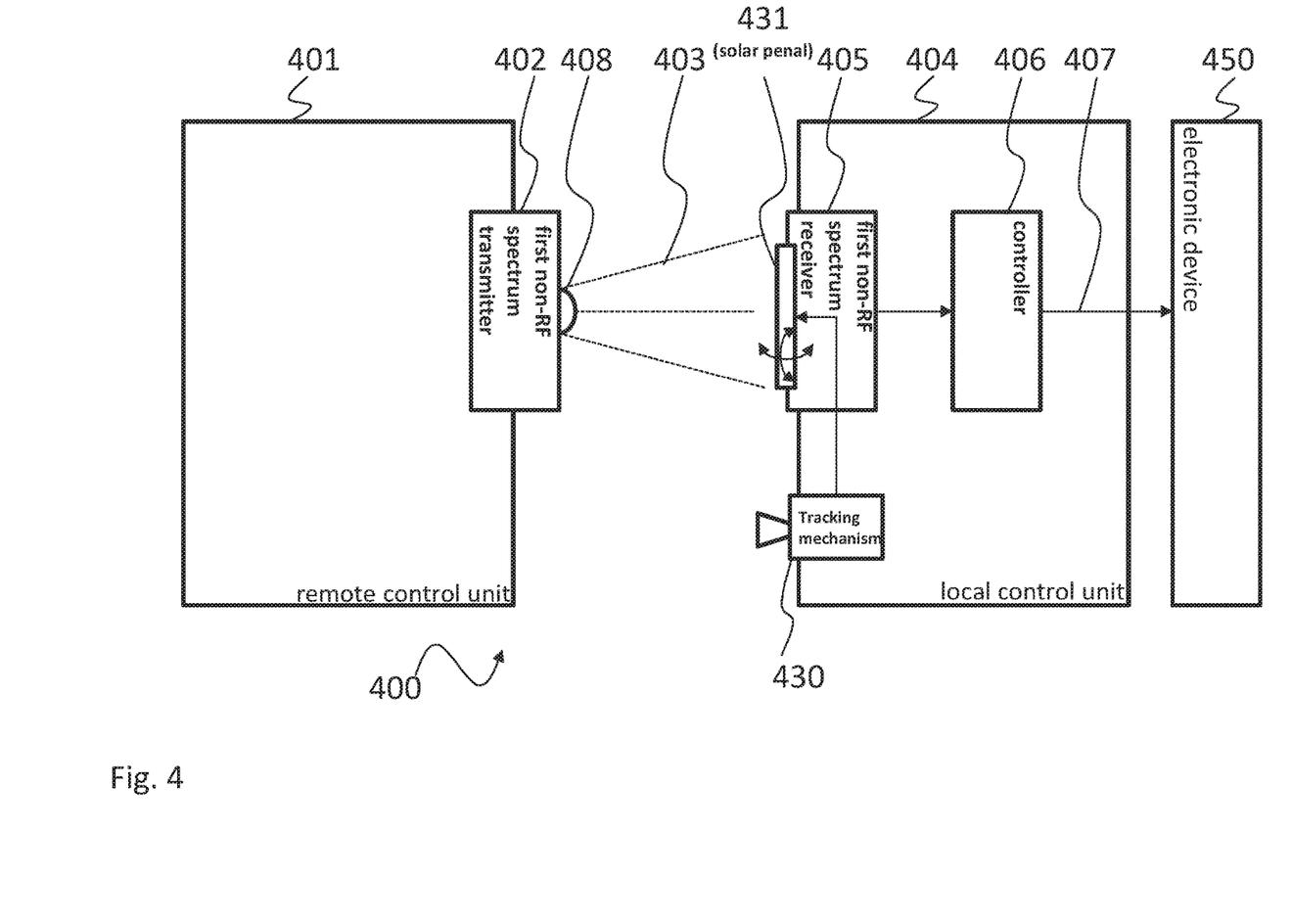
FIG. 4 shows a block diagram of another embodiment of a control arrangement according to the present invention.

FIG. 4 shows a block diagram of another control arrangement 400. The control arrangement 400 is based on the control arrangement 100 and therefore also comprises remote control unit 401 with the first non-RF spectrum transmitter 402 and with the white LED 408, as well as the local control unit 404 with the first non-RF spectrum receiver 405 and with the controller 406.

In the first non-RF spectrum receiver 405 a solar panel 431 is provided as optical receiver. The solar panel 431 may at the same time provide electrical power e.g. to the controller 406. The solar panel 431 has a larger surface than the photo diode 109 of the control arrangement 100 and therefor may improve the reception quality when receiving the non-RF spectrum uplink communication signals 403 from the white LED 408 of the first non-RF spectrum transmitter 402.

To further improve the reception quality, the local control unit 404 comprises a tracking mechanism 430. The tracking mechanism 430 tracks the remote control unit 401. The tracking mechanism 430 is just exemplarily shown as camera based tracking mechanism 430. Such a tracking mechanism 430 may e.g. track the remote control unit 401 with the help of an image or pattern recognition algorithm. As an alternative identification marks, like e.g. QR-codes or bar-codes, may be provided on the remote control unit 401.

The first non-RF spectrum receiver 405 may then position the solar panel 431, at least in one dimension or around one axis, according to the tracked position of the remote control unit 401.

Although not shown, the first non-RF spectrum receiver 405 may e.g. comprise electric actuators to move or position the solar panel 431.

For sake of clarity in the following description of the method based FIG. 5 the reference signs used above in the description of apparatus based FIGS. 1-4 will be maintained.

Figure 5:
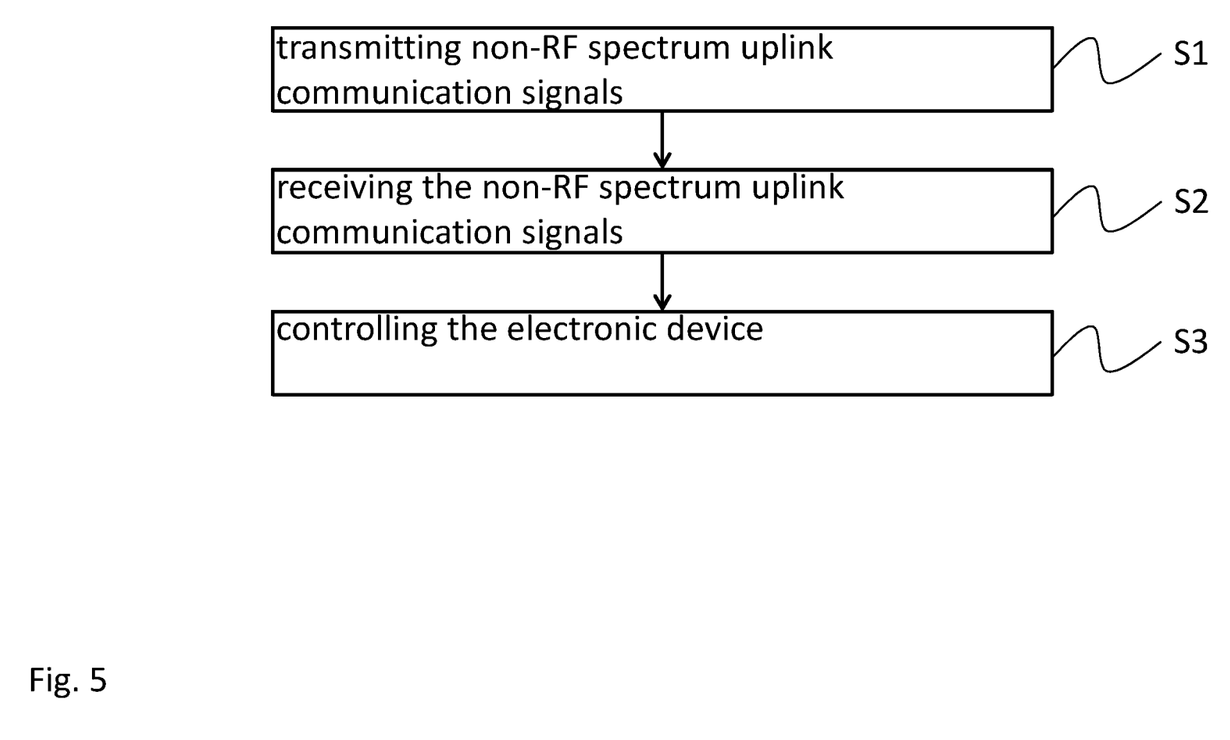
FIG. 5 shows a flow diagram of an embodiment of a control method according to the present invention.

FIG. 5 shows a flow diagram of a control method for remotely controlling an electronic device 150, 250, 350, 450.

The control method comprises transmitting S1 non-RF spectrum uplink communication signals 103, 203, 303, 403 to a local control unit 104, 204, 304, 404 at the electronic device 150, 250, 350, 450 from a remote control unit 101, 201, 301, 401. The control method further comprises receiving S2 the non-RF spectrum uplink communication signals 103, 203, 303, 403 at the local control unit 104, 204, 304, 404, and controlling S3 the electronic device 150, 250, 350, 450 based on the received non-RF spectrum uplink communication signals 103, 203, 303, 403.

The control method may further comprise receiving user input 211, 311, wherein the non-RF spectrum uplink communication signals 103, 203, 303, 403 are transmitted based on the received user input 211, 311. This means that the non-RF spectrum uplink communication signals 103, 203, 303, 403 may e.g. be modulated according to the user input 211, 311 or may comprise a digital representation of the user input 211, 311.

The user input 211, 311 may e.g. be received as audio user input 211, 311 and the non-RF spectrum uplink communication signals 103, 203, 303, 403 may be modulated based on the received audio user input 211, 311, e.g. with an AM or FM modulation or with a digital audio transmission. The method may then further comprise decoding the audio user input 211, 311 and providing respective control signals 107, 207, 307, 407 to the electronic device 150, 250, 350, 450. Decoding may e.g. comprise converting the decoded audio user input 211, 311 into "Standard Commands for Programmable Instruments", SCPI, based control signals 107, 207, 307, 407.

To provide feedback to the user, the control method may further comprise generating non-RF spectrum downlink communication signals 214, 314 in the local control unit 104, 204, 304, 404 based on feedback signals 218, 318 of the electronic device 150, 250, 350, 450, and transmitting the non-RF spectrum downlink communication signals 214, 314 to the remote control unit 101, 201, 301, 401.

In the remote control unit 101, 201, 301, 401 the non-RF spectrum downlink communication signals 214, 314 may be received and provided to a user. The feedback signals 218, 318 may e.g. be generated as audio feedback signals 218, 318, and be provided as audio feedback to the user.

When generating the feedback signals 218, 318 the feedback signals 218, 318 may be encoded as voice feedback signals 218, 318, e.g. based on SCPI based result signals.

When voice or audio signals are used to provide commands from a user to the electronic device 150, 250, 350, 450 and vice versa, a natural speech dialogue may be performed with the user.

To improve the connection quality between the remote control unit 101, 201, 301, 401 and the local control unit 104, 204, 304, 404, the remote control unit 101, 201, 301, 401 may be tracked and the first non-RF spectrum receiver 105, 205, 305, 405 of the local control unit 104, 204, 304, 404 may be aimed at the tracked remote control unit 101, 201, 301, 401.

Finally, the non-RF spectrum uplink communication signals 103, 203, 303, 403 may be received via a solar panel 431, that may also at least in part power the local control unit 104, 204, 304, 404.

Although specific embodiments have been illustrated and described herein, it will be appreciated by those of ordinary skill in the art that a variety of alternate and/or equivalent implementations exist. It should be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents. Generally, this application is intended to cover any adaptations or variations of the specific embodiments discussed herein.

In the foregoing detailed description, various features are grouped together in one or more examples or examples for the purpose of streamlining the disclosure. It is understood that the above description is intended to be illustrative, and not restrictive. It is intended to cover all alternatives, modifications and equivalents as may be included within the scope of the invention. Many other examples will be apparent to one skilled in the art upon reviewing the above specification.

Specific nomenclature used in the foregoing specification is used to provide a thorough understanding of the invention. However, it will be apparent to one skilled in the art in light of the specification provided herein that the specific details are not required in order to practice the invention. Thus, the foregoing descriptions of specific embodiments of the present invention are presented for purposes of illustration and description. They are not intended to be exhaustive or to limit the invention to the precise forms disclosed; obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. Throughout the specification, the terms "including" and "in which" are used as the plain-English equivalents of the respective terms "comprising" and "wherein," respectively. Moreover, the terms "first," "second," and "third," etc., are used merely as labels, and are not intended to impose numerical requirements on or to establish a certain ranking of importance of their objects.

LIST OF REFERENCE SIGNS

100, 200, 300, 400 control arrangement
101, 201, 301, 401 remote control unit
102, 202, 302, 402 first non-RF spectrum transmitter
103, 203, 303, 403 non-RF spectrum uplink communication signals
104, 204, 304, 404 local control unit
105, 205, 305, 405 first non-RF spectrum receiver 106, 206, 306, 406 controller
107, 207, 307, 407 control signals
108, 208, 216, 308, 316 optical emitter
408 optical emitter
109, 209, 213, 309, 313 optical receiver
210, 310 user input device
211, 311 user input
212, 312 second non-RF spectrum receiver
214, 314 non-RF spectrum downlink communication signals
215, 315 second non-RF spectrum transmitter
217, 317 output device
218, 318 feedback signal
320 microphone
321 modulator
322 voice decoder
323 command converter
324 speaker device
325 dialogue engine
326 voice encoder
327 audio feedback signal
430 tracking mechanism
431 solar panel
150, 250, 350, 450 electronic device
S1, S2, S3 method steps

The invention claimed is:

1. A control arrangement for communicating remotely with an electronic measurement device, the control arrangement comprising:
 a local control unit associated with the electronic measurement device, the local control unit comprising a first non-RF spectrum receiver for non-RF spectrum uplink communication signals in visible light spectrum and a controller coupled to the first receiver for controlling the electronic measurement device based on the received non-RF spectrum uplink communication signals in the visible light spectrum, wherein the controller of the local control unit comprises a voice decoder for decoding the audio user input and providing respective control signals, wherein the voice decoder comprises a command converter for converting the decoded audio user input into "Standard Commands for Programmable Instruments", SCPI, based control signals, and
 a remote control unit with a first non-RF spectrum transmitter for transmitting the non-RF spectrum uplink communication signals in the visible light spectrum to the local control unit, the remote control unit comprising a user input device for receiving user input, wherein the user input device comprises a microphone for receiving audio user input, wherein the first non-RF spectrum transmitter transmits the non-RF spectrum uplink communication signals in the visible light spectrum based on the received user input, wherein the first non-RF spectrum transmitter comprises a modulator that modulates non-RF spectrum uplink communication signals in the visible light spectrum based on the received audio user input.

2. The control arrangement of claim 1, wherein the remote control unit comprises a second non-RF spectrum receiver for receiving non-RF spectrum downlink communication signals, and wherein the controller of the local control unit generates non-RF spectrum downlink communication signals based on feedback signals, the local control unit comprising a second non-RF spectrum transmitter for transmitting the non-RF spectrum downlink communication signals to the remote control unit.

3. The control arrangement of claim 2, wherein the remote control unit comprises an output device that provides the feedback signals to a user.

4. The control arrangement of claim 3, wherein the controller of the local control unit generates the feedback signals as audio feedback signals, and wherein the output device comprises a speaker device.

5. The control arrangement of claim 4, wherein the controller of the local control unit comprises a voice encoder for encoding the feedback signals as voice feedback signals, especially wherein the voice encoder is configured to encode SCPI based result signals into voice feedback signals.

6. The control arrangement of claim 1, wherein the controller of the local control unit comprises a dialogue engine coupled to the voice decoder and the voice encoder for performing a natural speech dialogue with a user.

7. The control arrangement of claim 1, wherein the local control unit is integrated into the electronic measurement device or wherein the local control unit is connectable to an interface of the electronic measurement device.

8. The control arrangement of claim 1, wherein the first non-RF spectrum transmitter comprises at least one optical emitter for emitting the non-RF spectrum uplink communication signals in the visible light spectrum, and wherein the first non-RF spectrum receiver comprises respective optical receivers.

9. The control arrangement of claim 2, wherein the second non-RF spectrum transmitter comprises at least one optical emitter for emitting the non-RF spectrum uplink communication signals, and wherein the second non-RF spectrum receiver comprises respective optical receivers.

10. The control arrangement of claim 1, wherein the local control unit comprises a tracking mechanism for tracking the remote control unit and wherein the controller aims the first non-RF spectrum receiver at the tracked remote control unit.

11. The control arrangement of claim 1, wherein the first non-RF spectrum receiver comprises a solar panel.

12. The control arrangement of claim 11, wherein the local control unit is at least in part powered by the solar panel.

13. A control method for remotely controlling an electronic measurement device, the control method comprising:
 receiving audio user input,
 decoding the audio user input,
 converting the decoded audio user input into "Standard Commands for Programmable Instruments", SCPI, based control signals,
 transmitting non-RF spectrum uplink communication signals to a local control unit at the electronic measurement device from a remote control unit, wherein transmitting the non-RF spectrum uplink communication signals comprises transmitting the non-RF spectrum uplink communication signals based on the received audio user input,
 receiving the non-RF spectrum uplink communication signals at the local control unit, and
 controlling the electronic measurement device based on the received non-RF spectrum uplink communication signals.

14. The control method of claim 13, comprising generating non-RF spectrum downlink communication signals in the local control unit based on feedback signals of the electronic measurement device, transmitting the non-RF spectrum downlink communication signals to the remote control unit, and receiving non-RF spectrum downlink communication signals at the remote control unit.

15. The control method of claim 14, comprising providing the feedback signals to a user, especially wherein the feedback signals are generated as audio feedback signals, and the feedback signals are provided as audio feedback to the user.

16. The control method of claim 15, wherein generating the feedback signals comprises encoding the feedback signals as voice feedback signals, especially wherein SCPI based result signals are encoded into the voice feedback signals.

17. The control method of claim 13, comprising performing a natural speech dialogue with the user.

18. The control method of claim 13, comprising tracking the remote control unit and aiming a first non-RF spectrum receiver of the local control unit at the tracked remote control unit.

19. The control method of claim 13, wherein receiving is performed via a solar panel, especially wherein the solar panel at least in part powers the local control unit.

* * * * *